April 14, 1959  G. R. SPIES, JR  2,881,826
CUTTING TORCH TIP
Filed July 16, 1956
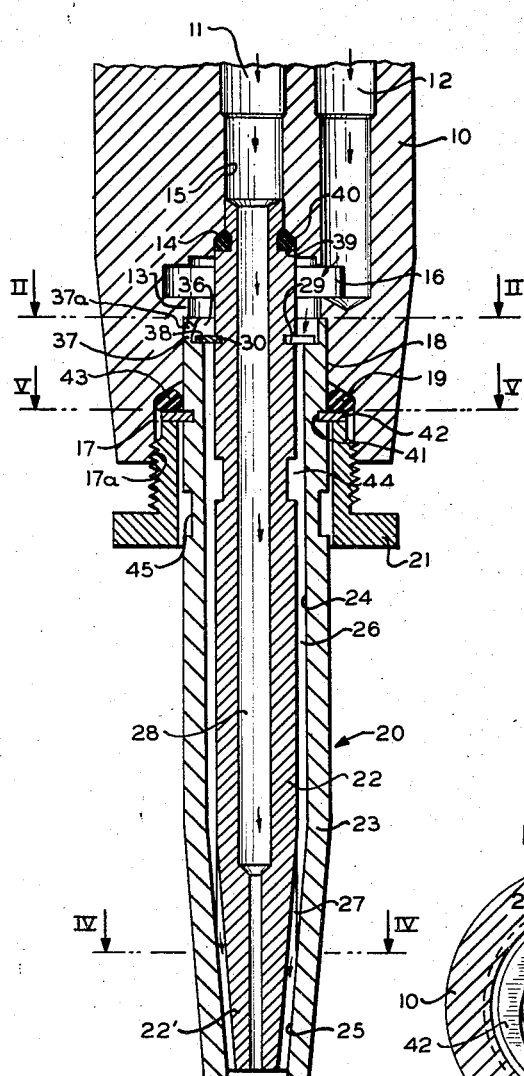
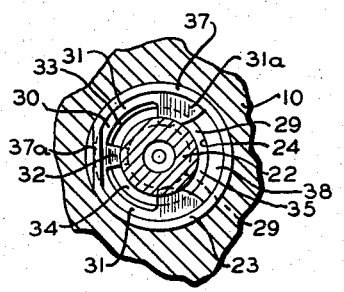
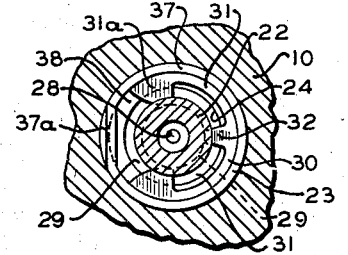
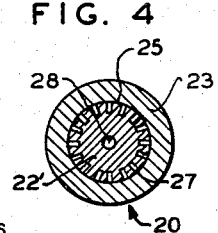
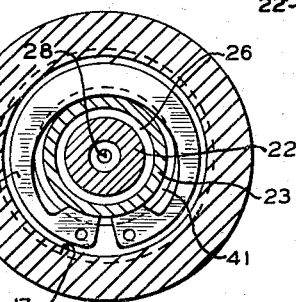
INVENTOR.
GEORGE R. SPIES, JR.
BY H. Hume Matthews
Edmund W Bopp
ATTORNEY & AGENT United States Patent Office 2,881,826
Patented Apr. 14, 1959

2,881,826

CUTTING TORCH TIP

George R. Spies, Jr., Murray Hill, N.J., assignor to Air Reduction Company, Incorporated, New York, N.Y., a corporation of New York Application July 16, 1956, Serial No. 598,098

6 Claims. (Cl. 158—27.4)

The present invention relates to gas cutting torches, and more particularly to a novel and improved tip for a gas cutting torch.

Conventional oxygen cutting torches are provided with a torch tip having passages therein for cutting oxygen and for heating gas, such as a combustible mixture of oxygen and acetylene or natural gas. During normal use it is frequently necessary for the operator to replace a cutting tip with another in order to cut a workpiece of different thickness or composition. Accordingly, the present invention seeks to provide an improved tip for a gas cutting torch which may be economically manufactured and which may be quickly interchanged with another such tip, without requiring the use of special tools or equipment.

More specifically, the invention provides a novel cutting torch tip which utilizes a minimum of metal stock and requires a minimum of machining in the manufacture thereof. In this respect, the new torch tip advantageously incorporates snap ring elements to form shoulders for securing parts of the tip together and for securing the tip assembly in the torch head. The improved tip also incorporates a novel structure wherein at least one of the shoulder-forming snap ring elements forms a seat for a sealing element, facilitating the interchangeable assembly of the tips into the torch heads.

Another novel and advantageous feature of the invention resides in the use of a novel snap ring element for simultaneously forming a shoulder on one of the parts of the tip assembly and providing passages in the tip assembly for the flow of gas. The same snap ring element is also utilized for interlocking the parts of the tip in assembled relation, the arrangement being such that a rapid and efficient assembly of the tips is afforded.

The invention also includes a novel arrangement, in an interchangeable torch tip assembly, for utilizing O-ring or equivalent resilient sealing elements and avoiding excessive heating of the sealing elements. In this respect, the new torch tip includes provisions for minimizing the flow of heat along the parts of the tip, from the outer end thereof to the sealing elements.

For a better understanding of the invention, reference should be made to the following detailed description and accompanying drawings, in which:

Fig. 1 is a longitudinal cross-section of a torch tip constructed in accordance with the present invention, illustrating the manner in which the tip is assembled in a torch head;

Fig. 2 is a cross-section taken on line 2—2 of Fig. 1;

Fig. 3 is a cross-section similar to Fig. 2, illustrating the manner in which parts of the new torch tip are assembled; and Figs. 4 and 5 are cross-sectional views taken on lines 4—4 and 5—5, respectively, of Fig. 1.

Referring initially to Fig. 1, the numeral 10 designates generally a torch head, having passages 11, 12 therein for cutting oxygen and preheating gas, respectively. In the illustrated torch, it is contemplated that a combustible mixture of oxygen and natural gas will be employed as the preheating gas, although it will be understood that this is merely by way of example and does not in any way constitute a limitation.

The torch head 10 may, in general, be of conventional construction. The cutting oxygen passage 11 is substantially coaxial with the head 10, and terminates in a series of bores, starting with bore 15 and bores of increasing diameter separated by transverse and inclined frustoconical shoulders. The passage 12, for preheating gas, communicates with a recess 16 below the inclined shoulder 14 and above the transverse shoulder 13.

The large diameter bore 17 in the end of the head contains internal threads 17a. Another frustoconical shoulder 19 is formed between the bore 17 and the next smaller diameter bore 18 immediately above it.

As shown in Fig. 1, the torch head is adapted to receive a torch tip assembly 20, to be described in detail. The tip is secured in the head by means of a threaded member 21 commonly referred to as a tip nut, engaging the threads 17a of the head 10.

The torch tip assembly comprises a tip insert 22 and the tip shell 23 assembled in coaxial relation. The shell 23 is generally cylindrical, having a cylindrical bore 24 extending from its inner end and joining near the outer end of the shell with a tapered bore 25. The insert 22 is also generally cylindrical, of a smaller diameter than the main bore 24 of the shell 23, and has a tapered outer end portion 22' complementary to the tapered bore 25 in the shell. The arrangement is such that when the insert 22 is assembled with the shell 23, an annular passage 26 is provided between the shell and insert. The annular passage 26 terminates near the lower end of the tip assembly, and a plurality of longitudinal slots 27 provided in the lower end of the insert 22 communicate with the annular space 26 and open at the lower end of the tip assembly.

Extending longitudinally of the tip insert 22, throughout the entire length thereof, is a bore 28, which is of reduced diameter at its lower end. The bore 28 constitutes one passage through the tip assembly, while the annular passage 26 and slots 27 constitute a second passage.

In accordance with usual practice, the tip insert 22 and tip shell 23 are adapted to be assembled together for insertion in the torch head 10 as a unit. To this end, the shell 23 of the new tip assembly is provided, at a point spaced from its inner end, with an annular groove 29. Received in the groove 29, and resiliently retained therein, is an E ring 30. The E ring 30 is, in itself, of conventional E-shaped design, being formed of a suitable spring steel and having arcuate legs 31 forming an incomplete circle. At the end of each of the legs 31 is an enlarged inwardly projecting tongue 31a, and at the common base of the legs 31 is an inwardly projecting tongue 32. The arrangement is such that the E ring 30 may be applied onto the tip insert 22 by inserting the tongues 31a in the groove 29 and pressing the ring transversely of the insert 22. This causes the legs 31 to spread resiliently, allowing the tongues 31a to pass over the maximum diameter of the groove 29 until the central tongue 32 moves into the groove and acts as a stop. When the E ring is thus assembled, a plurality of open areas 33, 34, 35 are provided about the outer surface of the insert 22, as indicated in Fig. 2.

As shown in Fig. 1, the tip shell 23 is somewhat shorter than the insert 22, and is provided at its inner end with a recess 36 surrounded by a relatively thin wall 37. The recess 36 is of approximately the same diameter as the E ring 30, and is adapted to receive the E ring and support it upon a shoulder 38 formed by the bottom of the recess 36. The manufacturing tolerances are preferably such that the tip insert 22 is supported in the shell 23 substantially wholly by the E ring 30 rather than by the tapered lower end portion of the insert. The E ring 30 serves additionally to maintain the upper end of the insert in concentric relation with the shell 23, to properly define the annular passage 26 through the tip assembly. In this respect, it will be noted that the open spaces 33—35 provided by the E ring 30 form passage means leading into the annular passage 26 from the inner end of the assembly.

To retain the insert 22 and shell 23 in assembled relation, the wall 37 surrounding the recess 36 is deformed inwardly at one point, as at 37a, so that the opening of the recess is reduced at that point to a distance less than the outer diameter of the E ring 30. The insert 22, with the E ring 30 assembled thereon, is inserted in the shell 23, in such orientation thereto that the open side of the E is opposite the deformed wall portion 37a. When the E ring 30 is resting upon the shoulder 38 of the shell, the insert 22, together with the E ring 30, is rotated through 90 or 180 degrees, to a position such as shown in Fig. 3. In this position, the deformed wall portion 37a overlies the E ring 30 and prevents axial separation of the insert and shell.

When the tip assembly is applied to the torch head, the axial bore 28 through the insert 22 is placed in communication with the cutting oxygen passage 11 in the head 10. To this end, the inner end portion of the insert 22 is reduced somewhat and adapted to be received in the recess 15 in the head 10. Adjacent the reduced end of the insert 22 is a shoulder 39 upon which is supported an O-ring sealing element 40. The sealing element 40 is adapted to be seated against the outwardly facing inclined shoulder 14 in the head 10, when the tip assembly is applied to the head, to seal the connection between the passages 11 and 28.

As shown in Fig. 1, when the tip assembly is applied to the torch head the upper end of the shell 23 projects into the recess 18, and the edge of the upstanding wall 37 abuts the inwardly projecting shoulder 13. The annular passage 26 is then in communication with the preheating gas passage 12 through recess 16.

In order to seal the connection between the head 10 and the tip shell 23, the shell is provided near its inner end with an annular groove 41 (see Fig. 5), in which is received a conventional snap retaining ring 42. The retaining ring 42 is in the form of a substantially complete circle and defines a pair of oppositely facing shoulders. The inwardly facing shoulder supports an O-ring sealing element 43, which is adapted to be seated against the outwardly facing inclined shoulder 19 of the head 10. The outwardly facing shoulder of the retaining ring 42 is engaged by the end of the tip nut 21, whereby the ring 42 and tip assembly may be forcibly urged into the torch head to compress the O-ring sealing elements 40, 43 to properly seal the separate gas passages, and seat the edge of the tip shell 23 on the inwardly projecting shoulder 13. This metal to metal seating of the shell on shoulder 13 gives the assembly mechanical rigidity and prevents overcompression of the resilient sealing elements.

The assembled torch is used in a conventional manner, with the preheating gas flowing through the annular passage 26 and through the plurality of slots 27, while the cutting oxygen flows through the central bore 28. During operation of the torch, substantial heat is developed about the outer end of the tip assembly, tending to heat the entire assembly. If the tip assembly heats excessively, the O-ring sealing elements 40, 43 may be damaged.

In accordance with the invention, excessive heating of the sealing elements 40, 43 may be avoided by providing annular heat blocking grooves 44, 45 in the outer walls of the tip insert 22 and tip shell 23, respectively. The heat blocking grooves may be single grooves of the order of 3/16 of an inch in width, having a depth equal to approximately one-half the side wall thicknesses of the respective parts or may be a plurality of narrower grooves forming in effect fins on the surfaces. The heat blocking grooves confine the flow of heat to the inner portions of the walls of the insert and shell, so that the rate of conduction is reduced, and improved transfer of the heat into the outwardly flowing gases is realized. This results in a substantial reduction in heat flow to the sealing elements, so that the elements remain sufficiently cool during operation of the torch.

The new torch tip assembly has several important and advantageous features. The new tip is capable of highly economical manufacture, since its component parts are of a most simplified form and require a minimum of machining. For example, the tip insert 22 is of cylindrical form substantially throughout, and is provided with a shoulder at one end through the use of a retaining ring of an inexpensive, commercially available type. The tip shell 23 is provided with a double shoulder by means of a retaining ring of a different type, but of an inexpensive and commercially available type. The use of the retaining rings in both instances eliminates substantial machining time and results in the saving of a large amount of material.

Another novel and advantageous feature of the invention resides in the use of an E-ring retainer to support and position the tip insert 22 in assembled relation with the tip shell 23. The E-shaped ring avoids the costly drilling of small diameter holes by providing a plurality of large openings between the insert and shell to afford pasage means for the preheating gas to enter the annular passage 26. Moreover, the open side of the E-ring retainer may be used to great advantage in connection with the assembly of the insert and shell. In this respect, the shell is provided with a partially deformed recess for receiving the E-shaped retainer. The parts are assembled together with the open side of the E facing the deformed portion of the recess. Then, the insert and shell are rotated relative to each other, so that a closed side of the E ring lies toward the deformed portion of the recess. This securely locks the assembled parts together, while permitting quick disassembly by means of a procedure reverse to that just described.

The invention also provides an improved arrangement for utilizing O-ring sealing elements, so that adequate sealing is afforded without accurately machined parts, and providing means to substantially reduce the flow of heat to the O-rings. Excessive heating and consequent damaging of the sealing elements is thereby effectively avoided.

It should be understood, however, that the specific device herein illustrated and described is intended to be representative only, as many changes may be made therein without departing from the clear teachings of the invention. Reference should therefore be made to the following appended claims in determining the full scope of the invention.

I claim:

1. In a cutting torch assembly including a metal torch head and a metal torch tip of the type comprising a tip shell and a tip insert the improvement which comprises resilient sealing means between the tip insert and the torch head, additional resilient sealing means between the tip shell and the torch head, means for applying sealing pressure to said resilient sealing means between said tip shell and torch head by the application of pressure to said tip shell, means for transmitting said pressure to said tip insert for applying sealing pressure to said resilient sealing means between said tip insert and said torch head and metal seating means on said torch head and said tip shell that engage to form a metal to metal seat upon the application of sufficient pressure to said tip shell to produce limited deformation of said resilient sealing means to thereby provide mechanical rigidity to said assembly.

2. A torch tip assembly for gas cutting torches and the like comprising a tip shell having a longitudinal opening therethrough, a tip insert received in said opening and defining with the inner wall of said shell an annular passage for gas and having a circumferential groove in the outer surface thereof for receiving a retainer ring, a retainer ring seated in said groove and projecting beyond the outside diameter of said insert a distance greater than the distance separating said insert from the inner wall of said shell and forming the gas passage therebetween, said retainer ring having openings therethrough for the passage of gas beyond said ring into the passage between said insert and shell, means on said shell to receive the projecting portion of said retainer ring including a shoulder adapted to engage said retainer ring to maintain said shell in predetermined spaced relation to said insert and to transmit a tip securing force applied to said shell from said shell to said insert for the assembly of the torch tip in a torch head.

3. The torch tip assembly of claim 2, characterized by said retainer ring having an open side and said shell having a portion projecting inwardly over said shoulder, said insert and shell being adapted to be assembled when the open side of said retainer ring faces said inwardly projecting portion and being locked together when said inwardly projecting portion overlies said retainer ring.

4. The torch tip assembly of claim 3, characterized by said retainer ring comprising an E-shaped ring having a plurality of inwardly projecting tongues, said annular groove being of a depth less than the length of said tongues.

5. The torch tip assembly of claim 3, characterized by said shell having a recess in its inner end surrounded by a relatively thin wall, the bottom of said recess forming said shoulder, and said wall having a portion deformed radially inward and defining said inwardly projecting portion.

6. A cutting torch assembly comprising a metal torch head having a cylindrical bore therein that diminishes in diameter in steps from the face of the torch head to the base of said bore to thereby form at least three annular seating surfaces of varying diameter, a torch tip including a metal tip insert and a tip shell, a first non-metallic resilient sealing means adapted to cooperate with said tip insert and the smallest of said three annular seating surfaces to form a gastight seal between said torch head and an annular zone on said tip insert, a seating surface on said tip shell adapted to make metal to metal engagement with the intermediate diameter surface of said three annular seating surfaces, a second non-metallic resilient sealing means adapted to cooperate with said tip shell and the largest of said three annular seating surfaces to form a gastight seal between said torch head and an annular zone on said tip shell, a retaining element adapted to engage said torch head and apply a retaining force to a bearing surface on the exterior of said tip shell to cause said second resilient sealing means to be compressed to form a gastight seal between said torch head and said tip shell, and to cause said tip shell and torch head to consummate said metal to metal seating engagement, and cooperating bearing means on said tip shell and tip insert to transmit said retaining force from said tip shell to said tip insert to cause said first resilient sealing means to be compressed to form a gastight seal between said torch head and said tip insert.

References Cited in the file of this patent
UNITED STATES PATENTS

| | | |
|---|---|---|
| 1,282,416 | Harris | Oct. 22, 1918 |
| 1,526,923 | Meden | Feb. 17, 1925 |
| 2,176,813 | Hammon | Oct. 17, 1939 |
| 2,348,774 | Anthes | May 16, 1944 |
| 2,355,849 | Crowley | Aug. 15, 1944 |
| 2,487,803 | Heimann | Nov. 15, 1949 |
| 2,491,310 | Heimann | Dec. 13, 1949 |
| 2,506,415 | Geffroy | May 2, 1950 |
| 2,518,895 | Jacobsson et al. | Aug. 15, 1950 |
| 2,702,079 | Smith | Feb. 15, 1955 |
| 2,759,531 | Anthes | Aug. 21, 1956 |